(12) United States Patent
Kim

(10) Patent No.: US 6,900,917 B2
(45) Date of Patent: May 31, 2005

(54) LASER SCANNING APPARATUS

(75) Inventor: Hyung-su Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 105 days.

(21) Appl. No.: 10/412,243

(22) Filed: Apr. 14, 2003

(65) Prior Publication Data

US 2003/0227660 A1 Dec. 11, 2003

(30) Foreign Application Priority Data

Jun. 5, 2002 (KR) .................................. 10-2002-0031766

(51) Int. Cl.[7] .............................................. G02B 26/08
(52) U.S. Cl. ...................... 359/205; 359/204; 359/208; 359/207
(58) Field of Search ................................. 359/204–208, 359/739–740; 347/233, 243, 244, 258, 259

(56) References Cited

U.S. PATENT DOCUMENTS 5,517,330 A * 5/1996 Maeda ........................ 358/481
5,805,324 A * 9/1998 Endou ......................... 359/208
5,963,355 A * 10/1999 Iizuka ......................... 359/205

* cited by examiner

*Primary Examiner*—James Phan

(57) ABSTRACT

A laser scanning apparatus includes a light source to emit light fluxes, a first imaging optical system to magnify or reduce the light fluxes emitted from the light source in a given position and angle, a light deflector to deflect and reflect the light fluxes penetrated through the first imaging optical system, and a second imaging optical system to correct optical errors in the light fluxes reflected from the light deflector. The second imaging optical system includes a refraction/reflection lens part to alternatively refract and reflect the light fluxes reflected from the light deflector so that the light fluxes are refracted at least two times. Thus, the second imaging optical system may be provided with only one f-theta lens, minimizing a number of parts, reducing fabrication cost and increasing productivity of the laser scanning apparatus.

22 Claims, 4 Drawing Sheets

LASER SCANNING APPARATUS

CROSS REFERENCE TO RELATED APPLICATION

This application claims the benefit of Korean Application No. 2002-31766, filed Jun. 5, 2002, in the Korean Intellectual Property Office, the disclosure of which is incorporated herein by reference.

BACKGROUND OF THE INVENTION

1. Field of the Invention

The present invention relates to a laser scanning apparatus adapted to use in an image forming apparatus such as an electro-photograph type printer, a laser facsimile machine, a digital copier, etc., which images light fluxes such as laser beams or light beams emitted from a light source on an imaging surface of a photosensitive element, and more particularly, to a laser scanning apparatus having an imaging optical system in which only one f-theta lens is used to image light fluxes reflected from a light deflector as uniform light spots on the imaging surface of the photosensitive element.

2. Description of the Related Art

Generally, a laser scanning apparatus which is used in an image forming apparatus such as a laser printer, a digital copier, a laser facsimile machine, etc., uses a light source to generate light fluxes such as laser beams to form an electrostatic latent image on a photosensitive element such as a photosensitive drum according to an image signal.

The laser scanning apparatus has a first imaging optical system to magnify or reduce light fluxes emitted from the light source, into parallel-linear lights and to lead them to a light deflector rotating in a high speed in a given direction. The laser scanning apparatus also has a second imaging optical system to converge light fluxes reflected from the light deflector as uniform light spots on an imaging surface of the photosensitive element to form the electrostatic latent image.

The first and second imaging optical systems generally include more than two lenses or mirrors. Particularly, since the second imaging optical system has expensive large-sized f-theta lenses of glass or plastic material or a combination of plural f-theta lenses and/or reflection mirrors, there is a problem that the lenses and/or mirrors are very heavy and miniaturization of their size is difficult. Recently, the second imaging optical system combined by two f-theta lenses and/or mirrors has been designed and used to obtain good optical performance by minimizing their size and cutting down their expense.

Referring now to FIG. 1, there is illustrated a general light scanning apparatus 10 to form an electrostatic latent image on an imaging surface of a photosensitive element.

The light scanning apparatus 10 includes a semiconductor laser 20 to emit laser beams according to an image signal mounted on a printed circuit board disposed on a main body frame 14, a collimating lens 22 to change the laser beams emitted from the semiconductor laser 20 into lights parallel to an optical axis, and an opening part 24 to standardize the laser beams penetrating through the collimating lens 22 in a required size. The light scanning apparatus also includes a cylindrical lens 26 to converge the laser beams to a sub-scanning direction and to change laser beams into linear lights in a main scanning direction, and a light deflector 28 disposed at a position converging the laser beams in the form of linear lights emitted through the cylindrical lens 26 to deflect a reflective direction of the laser beams.

The light deflector 28 is provided with a polygon mirror 29 having a plurality of deflective reflection surfaces 29a to deflect the reflective direction of the laser beams by moving the laser beams at a constant linear velocity. The light detector 28 is also provided with a spindle motor (not shown) to rotate the polygon mirror 29 at a constant velocity.

Also provided in the laser scanning apparatus 10, is a scanning lens system having first and second f-theta lenses 30, 32 to correct optical errors contained in the deflected laser beams to have a given index of refraction to the optical axis by the deflective reflection surfaces 29a and to refract them to the main scanning direction. First and second reflective mirrors 34, 38 and a cylindrical reflection mirror 36 to reflect the laser beams penetrated through the scanning lens system onto the imaging surface of the photosensitive drum 40 are arranged on the path of the laser beams. The first reflective mirror 34 which does not have a refractive power is adjusted in a direction of arrow B to correct a magnification difference between left and right deterioration in picture quality of the image, and the cylindrical reflection mirror 36, which has a refractive power to the sub-scanning direction, is adjusted in a direction of arrow C to correct skewing of scanning lines in the deteriorating picture quality. Also, the second reflective mirror 38 which finally reflects the laser beams on the imaging surface of the photosensitive drum 40 is formed to mechanically bend and correct bowing of scanning lines.

Operation of the conventional laser scanning apparatus 10 will be explained below.

First, the laser beams emitted from the semiconductor laser 20 pass the collimating lens 22 to be changed into lights parallel to the optical axis. Then, the laser beams passing through the opening part 24 and the cylindrical lens 26 are changed into linear lights having the required size, and are then deflected by the deflective reflection surfaces 29a rotating in a high speed by the spindle motor.

Thereafter, the laser beams are reflected by the first and second reflective mirrors 34, 38 and the cylindrical reflection mirror 36 via the first and second f-theta lenses 30, 32, and then converged as light spots along the main scanning direction on the imaging surface of the photosensitive drum 40.

At this time, since the photosensitive drum 40 is driven to be rotated in the sub-scanning direction by a driving motor (not shown), an electrostatic latent image conforming to the image signal is formed on the photosensitive drum 40 as a result of the scanning movement of the light spots to the main scanning direction and the movement of the photosensitive drum 40 to the sub-scanning direction.

However, in the above described laser scanning apparatus 10, since the second imaging optical system forms a double path by using a plurality of parts including two f-theta lens 30, 32, one cylindrical reflection mirror 36, two reflective mirrors 34, 38, etc., there is a problem that assemblage of the apparatus 10 is difficult and productivity is lowered. Also, according to an increase in a number of parts, adjusting various devices to adjust the mirrors in the scanning apparatus 10 are required, resulting in an increase in fabrication cost.

Further, in the conventional laser scanning apparatus 10 using a front incidence type scanning optical system, since the bow of scanning lines generated as a result of a difference of incident or reflective angles in a sub-scanning cross-section direction at a scanning center part and a scanning periphery part is corrected by the second reflective mirror 38 formed to mechanically bend, accuracy of correction is low. In case of using the conventional laser scanning apparatus 10 as a laser scanning apparatus for color imaging, image stains or spots may be generated due to a difference in the bow quantity of scanning lines between the laser beams. This problem is also presented at the first reflective mirror 34 and the cylindrical reflection mirror 36.

Also, since the conventional laser scanning apparatus 10 images the laser beams in the sub-scanning direction on the image surface by using the cylindrical reflection mirror 36 having the same curvatures to have one refractive power only to the sub-scanning direction, there is a technical limit to realize good optical performance above a 1,200 dpi grade. Particularly, since to obtain a light path from the light deflector 28 to the photosensitive drum 40, size of the cylindrical reflection mirror 36 in a transverse direction (that is, a length thereof in the sub-scanning direction) should be increased, which enlarges the size of the scanning apparatus 10, increasing a weight of the scanning apparatus 10. Thus, when the size and weight of mirrors are enlarged, fabrication and material costs are increased, and at the same time, designing surface shapes of lenses become difficult. Thus, a manufacturing process such as lens designing, mold production, injecting molding, etc., is difficult, resulting in an increase in manufacturing time and cost.

SUMMARY OF THE INVENTION

Accordingly, it is an aspect of the present invention to provide an improved laser scanning apparatus having an imaging optical system, minimizing a number of parts to reduce fabrication cost and increasing productivity. Based upon various configurations of the present invention, the imaging optical system may be provided with only one f-theta lens to image light fluxes reflected from a light deflector as uniform light spots on an imaging surface of a photosensitive element, minimizing the number of parts to reduce fabrication cost and increasing productivity.

It is another aspect of the present invention to provide an improved laser scanning apparatus having an imaging optical system which is used to solve a problem of generating a large change in imaging performance even by small optical error in fabrication, as in a conventional laser scanning apparatus in which a refractive power is concentrated only on optical surfaces having one refraction or reflection function, increasing optical performance and a degree of freedom in design and fabrication. Based upon various configurations of the present invention, the imaging optical system may be provided with only one f-theta lens having two refraction faces and a reflection face simultaneously formed at surfaces thereof, increasing the optical performance and degree of freedom in design and fabrication of the laser scanning apparatus.

Additional aspects and advantages of the invention will be set forth in part in the description which follows and, in part, will be obvious from the description, or may be learned by practice of the invention.

The foregoing and/or other aspects of the present invention are achieved by providing a laser scanning apparatus including a light source to emit light fluxes, a first imaging optical system to magnify or reduce the light fluxes emitted from the light source in a given position and angle, a light deflector to deflect and reflect the light fluxes penetrated through the first imaging optical system, and a second imaging optical system to correct optical errors in the light fluxes reflected from the light deflector, and having a refraction/reflection lens part to alternatively refract and reflect the light fluxes reflected from the light deflector so that the light fluxes are refracted at least two times.

According to an aspect of the invention, the refraction/reflection lens part includes only one lens having a reflection face at one surface thereof.

According to an aspect of the invention, the refraction/reflection part includes another lens at the other surface thereof which includes a first refraction face to receive the light fluxes reflected from the light deflector, and a second refraction face to refract the light fluxes reflected from the reflection face after being incident through the first refraction face.

According to an aspect of the invention, the first and second refraction faces are formed of a shape having a plane or a spherical surface to a sub-scanning direction x and an aspherical surface to a main-scanning direction y, and the reflection face is formed of a shape having a spherical surface to the sub-scanning direction x and a continuously varied-aspherical surface to the main-scanning direction y.

According to another aspect of the invention, the first and second refraction faces and the reflection face are formed to allow angles of normal connecting between centers of curvature and vertexes at respective positions in the main-scanning direction y to be continuously varied.

According to an aspect of the invention, the aspherical shapes of the first and second refraction faces and the reflection face are defined as follows:

$$Z(x, y) = \frac{c_y y^2}{1 + \sqrt{1 - (k+1)c_y y^2}} + \hat{Q}_{l=3} A_l y^l +$$

$$\frac{\left[\frac{x^2}{c_x\left(1 + \hat{Q}_{m=2} B_m y^m\right)}\right] - 2x\sin\left(\hat{Q}_{n=2} C_n y^n\right)}{\cos\left(\hat{Q}_{n=2} C_n y^n\right) + \sqrt{\cos^2\left(\hat{Q}_{n=2} C_n y^n\right) - \left[\frac{x}{c_x\left(1 + \hat{Q}_{m=2} B_m y^m\right)}\right]^2 + \frac{2x\sin\left(\hat{Q}_{n=2} C_n y^n\right)}{c_x\left(1 + \hat{Q}_{m=2} B_m y^m\right)}}}$$

where, Z is a distance from an optical axis
  x, y are positions or distances to a point on the aspherical surface,
  k is a conical coefficient,
  A, B are aspherical coefficients,
  C is a curvature coefficient, and
  l, m, n are positive numbers greater than 3.

According to an aspect of the invention, the light source includes a semiconductor laser having at least one light-emitting point.

According to an aspect of the invention, the first imaging optical system includes a collimating lens to change the light fluxes emitted from the light source into parallel lights, an opening part to standardize the light fluxes in a given size, and a cylindrical lens having a refractive power to the sub-scanning direction x.

According to another aspect of the invention, the light deflector deflects the light fluxes to make a moving direction of incident light fluxes be opposed and symmetrical to a moving direction of the reflective light fluxes.

According to another aspect of the invention, the refraction/reflection lens part first includes a first lens, and a reflection face attached on one surface of the lens.

According to another aspect of the invention, the refraction/reflection lens part further includes a second lens at the other surface thereof which includes a first refraction face to receive light fluxes reflected from the light deflector, and a second refraction face to refract light fluxes reflected from the reflection face after being incident through the first refraction face.

BRIEF DESCRIPTION OF THE DRAWINGS

The above and/or other aspects and advantages of the invention will become apparent and more appreciated from the following description of the preferred embodiments, taken in conjunction with the accompanying drawings of which.

DETAILED DESCRIPTION OF PREFERRED EMBODIMENTS

Figure 1:
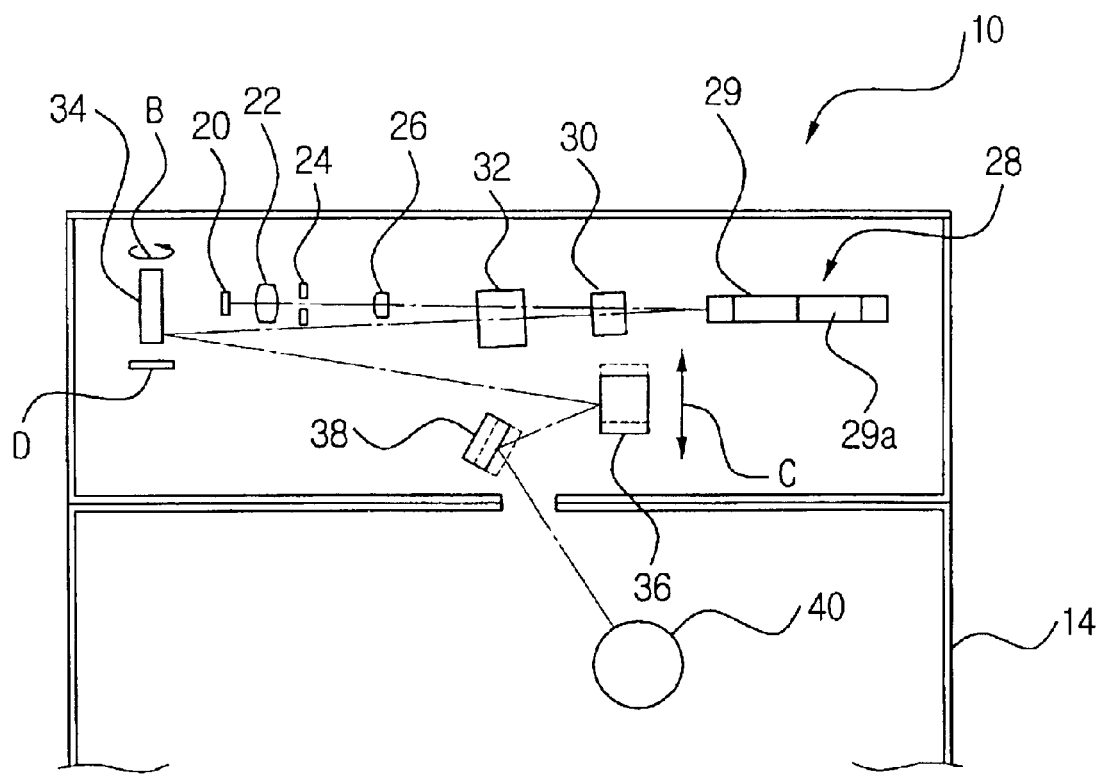
FIG. 1 is a schematic perspective view of a conventional laser scanning apparatus.

Reference will now be made in detail to the present preferred embodiments of the present invention, examples of which are illustrated in the accompanying drawings, wherein like reference numerals refer to like elements throughout.

Figure 2:
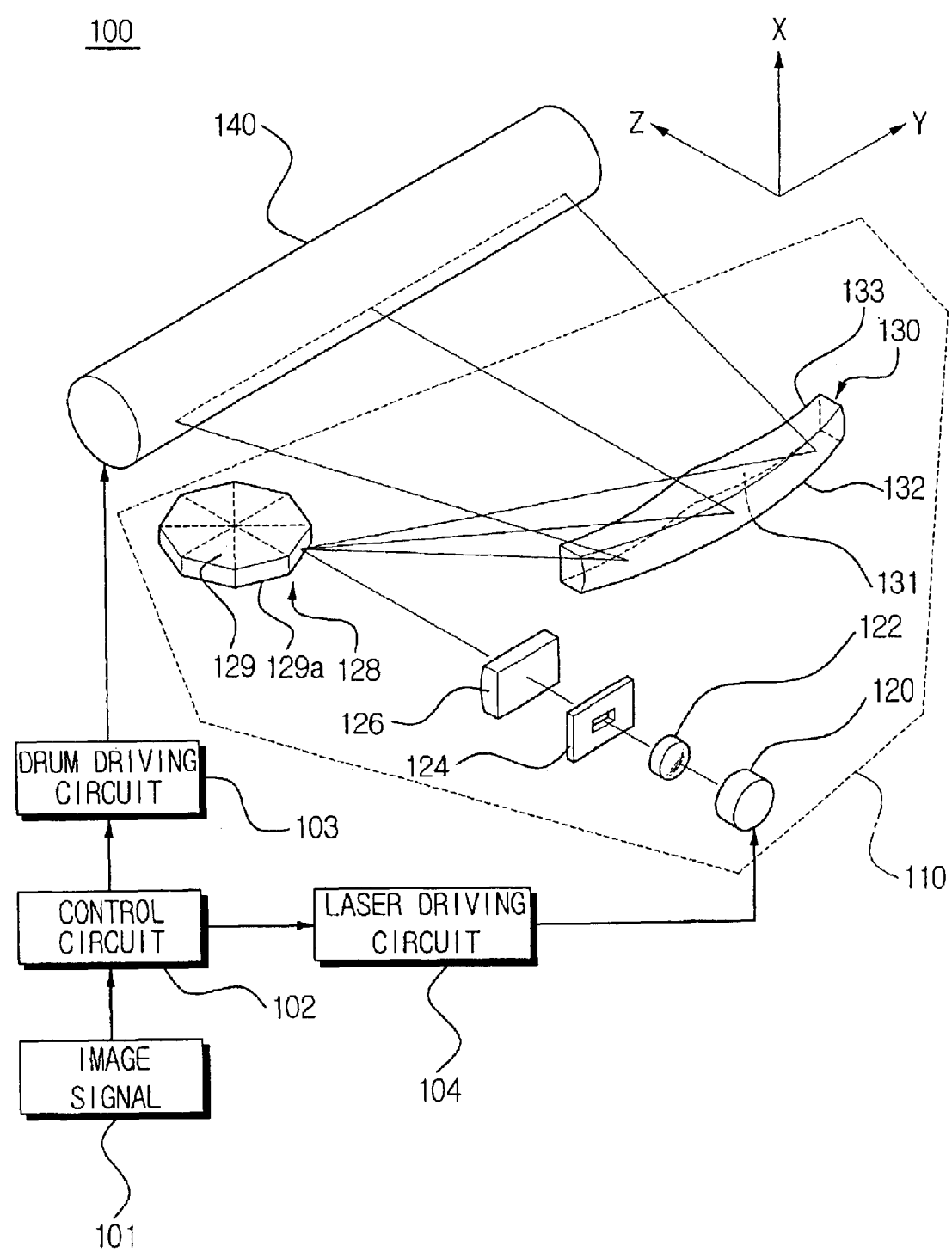
FIG. 2 is a schematic perspective view of an image forming apparatus having a laser scanning apparatus, according to an embodiment of the present invention.
Figure 3:
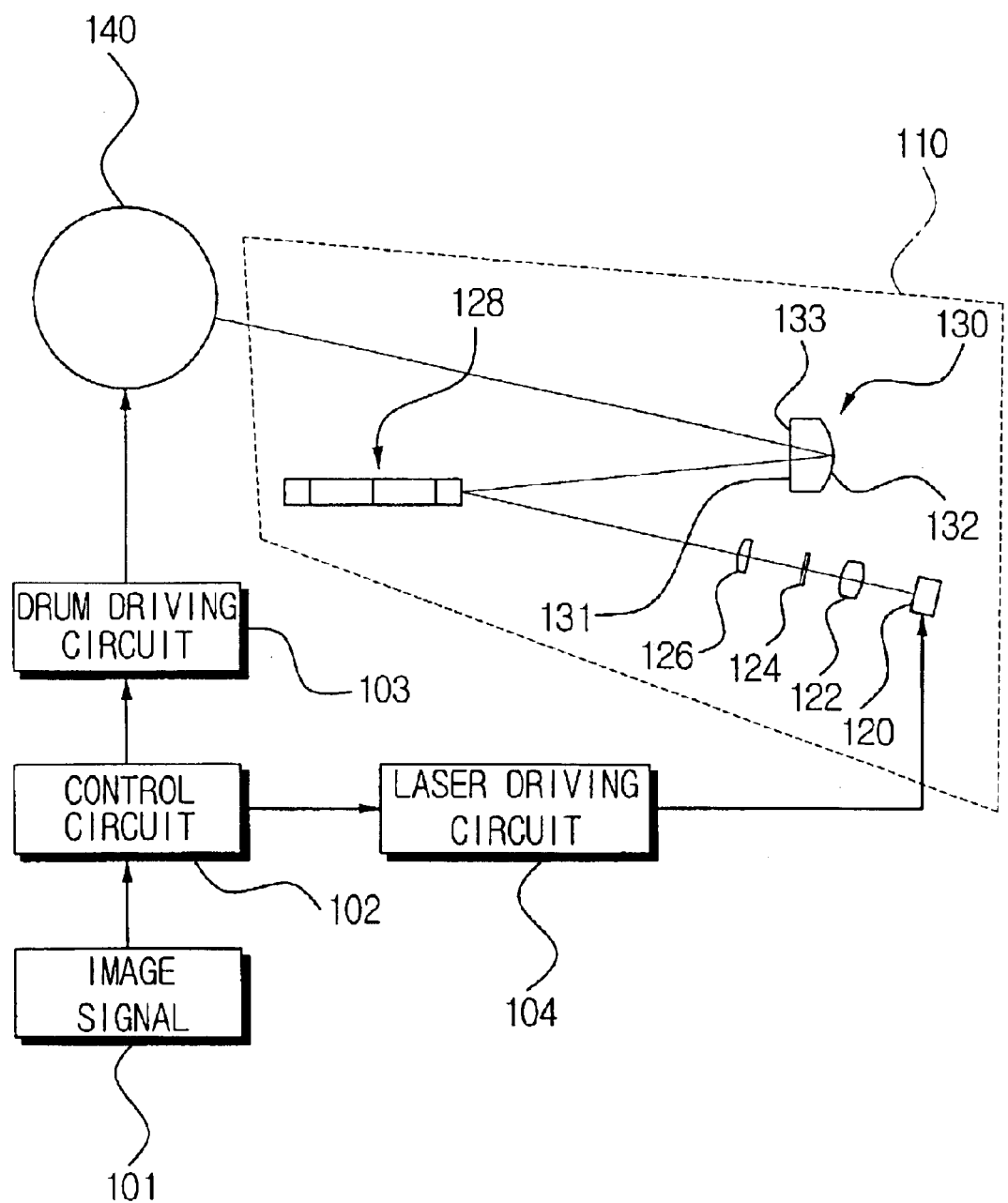
FIG. 3 is a cross-sectional view of the image forming apparatus illustrated in FIG. 2.

FIGS. 2 and 3 show an image forming apparatus 100 having a laser scanning apparatus, according to an embodiment of the present invention.

The image forming apparatus 100 includes a laser scanning apparatus 110, a photosensitive drum 140 having an imaging surface to image laser beams emitted from the laser scanning apparatus 110, and a drum driving circuit 103 to drive the photosensitive drum 140 at a given speed of revolution and to output a timing signal synchronous with a rotation of the photosensitive drum 140. The image forming apparatus also includes a laser driving circuit 104 to control a light source 120, and a control circuit 102 to output a printing signal and a driving signal to the laser driving circuit 104 and the drum driving circuit 103, respectively, by processing an image signal 101 outputted from a computer or central processing unit (CPU not shown), and outputting a control signal to the laser driving circuit 104 synchronously with the timing signal of the drum driving circuit 103.

The laser scanning apparatus 110 includes a light source 120 to emit light fluxes such as laser beams, a collimating lens 122 to change the laser beams emitted from the light source 120 in lights parallel to an optical axis z, an opening part 124 to standardize the laser beams penetrated through the collimating lens 122 at a given size, and a cylindrical lens 126 having a refractive power to a sub-scanning direction x to converge the laser beams to the sub-scanning direction x, and at the same time, to change them into linear lights to a main scanning direction y. The laser scanning apparatus 110 includes a light deflector 128 to deflect and reflect the laser beams in the form of linear lights penetrated through the cylindrical lens 126.

The light source 120 includes a semiconductor laser, which is mounted on a printed circuit board (not shown) disposed on a main body frame (not shown) and in which one or a plurality of light-emitting points or elements such as laser diodes is one or two-dimensionally arranged. When using the semiconductor laser having a plurality of light-emitting elements, a plurality of scanning lines corresponding to a number of the light-emitting elements is imaged on the imaging surface of the photosensitive drum 140 every scan.

The collimating lens 122 having a spherical or aspherical surface is formed of glass or a plastic material. The cylindrical lens 126 to refract the laser beams to the sub-scanning direction x and thereby produce the linear lights is disposed at an upstream side of the light deflector 128 in a laser beam-proceeding direction.

Thus, the collimating lens 122, the opening part 124, and the cylindrical lens 126 constitute a first imaging optical system to magnify or reduce the laser beams emitted from the semiconductor laser 120 in a given position and angle.

The light deflector 128 arranged between the photosensitive drum 140 and a f-theta or scanning lens 130 (as will be described later) is provided with a polygon mirror 129 having a plurality of deflective reflection surfaces 129a to deflect a reflective direction of the laser beams by moving the laser beams in the form of linear lights penetrated through the cylindrical lens 126 at a constant linear velocity. The light deflector 128 is also provided with a spindle motor (not shown) to rotate the polygon mirror 129 at a constant velocity.

The laser scanning apparatus 110 includes the f-theta or scanning lens 130 to correct optical errors in the laser beams deflected by the deflective reflection surfaces 129a of the polygon mirror 129. The scanning lens 130 functions as a second imaging optical system to image the laser beams reflected from the light deflector 128 on the imaging surface of the photosensitive drum 140 in a given position and angle.

The scanning lens 130 at one surface thereof has a reflection face 132. The reflection face 132 is formed of a free form or twist aspheric-toric surface, which is spherical to the sub-scanning direction x and continuously varied-aspherical to the main-scanning direction y.

At lower and upper portions of the other surface of the scanning lens 130, a first refraction face 131 to receive the laser beams reflected from the light deflector 128, and a second refraction face 133 to refract the laser beams reflected from the reflection face 132 after being incident through the first refraction face 131, are respectively formed. Each of the first and second refraction faces 131, 133 is formed of a free form or twist aspheric-toric surface, which is planar or spherical to the sub-scanning direction x and aspherical to the main-scanning direction y.

Figure 4:
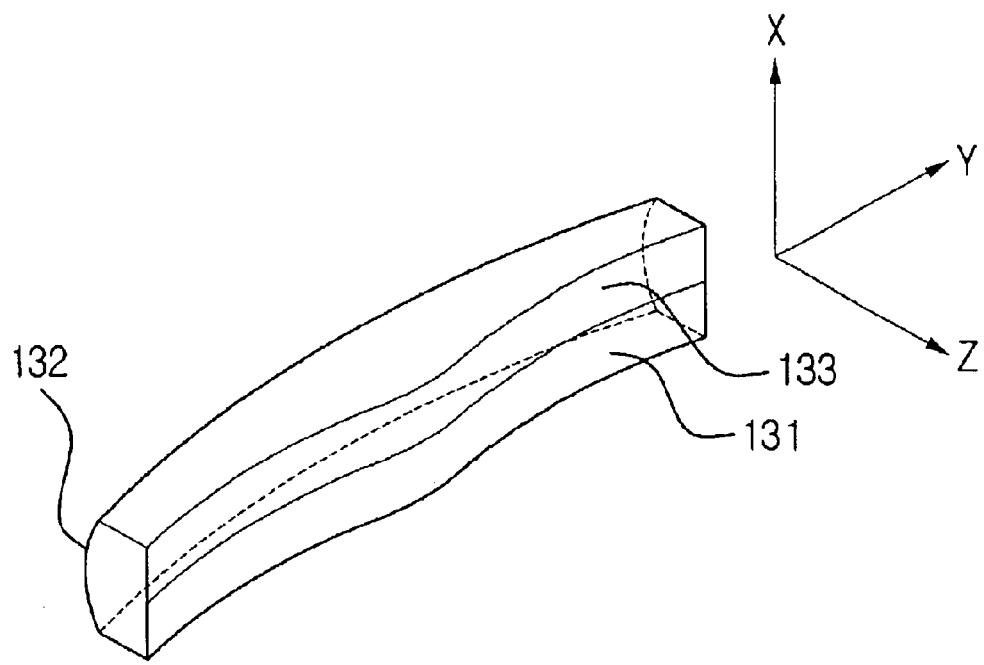
FIG. 4 is a cross-sectional view of a scanning lens of the laser scanning apparatus of the image forming apparatus illustrated in FIG. 2.

Particularly, as illustrated in FIG. 4, the first and second refraction faces 131, 133, or the reflection face 132 are preferably formed to allow angles of normal connecting between centers of curvature and vertexes at respective positions in the main-scanning direction y, to be continuously varied. Thus, by continuously varying the angles of normal, a degree of freedom in design and fabrication of the scanning lens 130 may be increased.

It is preferable that the aspherical shapes of the first and second refraction faces 131, 133 and the reflection face 132 satisfy the following equation:

$$Z(x, y) = \frac{c_y y^2}{1 + \sqrt{1 - (k+1)c_y y^2}} + \hat{Q} A_i y^l + \quad (1)$$

$$\frac{\left[\frac{x^2}{c_x\left(1 + \hat{Q}_{m=2} B_m y^m\right)}\right] - 2x\sin\left(\hat{Q}_{n=2} C_n y^n\right)}{\cos\left(\hat{Q}_{n=2} C_n y^n\right) + \sqrt{\cos^2\left(\hat{Q}_{n=2} C_n y^n\right) - \left[\frac{x}{c_x\left(1 + \hat{Q}_{m=2} B_m y^m\right)}\right]^2 + \frac{2x\sin\left(\hat{Q}_{n=2} C_n y^n\right)}{c_x\left(1 + \hat{Q}_{m=2} B_m y^m\right)}}}$$

where, Z is a distance from an optical axis;
x, y are positions or distances to a point on the aspherical surface;
k is a conical coefficient;
A, B are aspherical coefficients;
C is a curvature coefficient; and
l, m, n are positive numbers greater than 3.

In the above-described laser scanning apparatus 110, the second imaging optical system includes only one scanning lens 130. However, the present invention is not limited to only one scanning lens and thus, one or more reflection mirrors may be used to change the optical performance or path of the laser beams, or to increase or decrease a number of reflections of the laser beams.

In the laser scanning apparatus 110 of the present invention, a plurality of light sources, instead of the one light source 120 having one or more light-emitting elements, may be used and arranged such that the light deflector 128 and the scanning lens 130 are symmetrical to to the plurality of light sources.

Also, the image forming apparatus 100 in which the laser scanning apparatus 110 is applied includes an image forming part (not shown) having a charger, a cleaner, a development roller, a developer, and a transferrer, to carry out a series of image forming processing of forming a toner image on a printing material such as a sheet of printing paper. The image forming apparatus also includes a paper-feeding part (not shown) to feed the printing paper to the transferrer, a fixing part (not shown) to fix the toner image transferred onto the printing paper, and a paper-discharging part (not shown) to discharge the printing paper on which the toner image is fixed. Since composition of these components is the same as that of the conventional image forming apparatus, a detailed explanation thereof will be omitted.

An operation of the laser scanning apparatus 110 in accordance with the present invention will be explained with reference to FIGS. 2 and 3.

According to the image signal 101 inputted from the computer or CPU of the image forming apparatus 100, the control circuit 102 processes the image signal 101 and outputs the printing and driving signals to the laser driving circuit 104 and the drum driving circuit 103, respectively.

At this time, the drum driving circuit 103 controls the photosensitive drum 140 to rotate at a given speed of revolution, and simultaneously outputs a timing signal synchronous with the rotation of the photosensitive drum 140 to the control circuit 102. As the drum driving circuit 103 outputs the timing signal, the control circuit 102 outputs a control signal to the laser driving circuit 104 synchronously with the timing signal.

In the response to the control signal and a printing signal received from the control circuit 102, the laser driving circuit 104 drives the semiconductor laser 120 having the plurality of light-emitting elements. As a result, the semiconductor laser 120 emits laser beams at predetermined angles from the respective light-emitting elements.

The laser beams emitted from the semiconductor laser 120 are changed into parallel lights by the collimating lens 122, and then to linear lights having a given size through the opening part 124 and the cylindrical lens 126. Then, the laser beams proceed to the light deflector 128.

The laser beams incident on the light deflector 128 are deflected and reflected at a constant linear velocity by the deflective reflection surfaces 129a of the polygon mirror 129 rotating at a high speed of rotation by the spindle motor.

As a result, as illustrated in FIGS. 2 and 3, the laser beams enter the first refraction face 131 of the scanning lens 130 with given incident angles. The laser beams incident on the first refraction face 131 are refracted at a predetermined index of refraction to proceed to the reflection face 132.

On the second reflection face 132, the laser beams are reflected at angles symmetrical to angles incident thereon after being refracted through the first refraction face 131, and are then emitted toward the photosensitive drum 140.

The beams emitted through the second reflection face 132 are converged as a plurality of light spots on the imaging surface of the photosensitive drum 140. At this time, as the laser beams are deflected, the light spots form scanning lines along the main scanning direction y relative to the number of light-emitting elements of the semiconductor laser 120.

The photosensitive drum 140 is driven to be rotated in a given direction by a driving motor (not shown), and thereby is relatively moved to the light spots along the sub-scanning direction x. Accordingly, an electrostatic latent image conforming to the image signal is formed on the imaging surface of the photosensitive drum 140 as a result of a scanning movement of the light spots to the main scanning direction y and a movement of the photosensitive drum 103 to the sub-scanning direction x.

As the developer such as a colored toner is supplied to the electrostatic latent image formed on the imaging surface of the photosensitive drum 140 by the development roller (not shown) of the image forming part, the electrostatic latent image is developed into the toner image in the form of a visible image.

As the photosensitive drum 140 on which the toner image is formed is further rotated, the toner image is transferred onto the printing paper fed between the photosensitive drum 140 and the transfer roller (not shown) of the transferrer by the paper-feeding part.

Then, the photosensitive drum 140 keeps rotating, and a cleaning blade (not shown) of a cleaner removes developer remaining on the imaging surface of the photosensitive drum 140 to be able to form an electrostatic latent image again thereon in the subsequent scanning. At the same time, the toner image transferred onto the printing paper is fixed by the fixing part and then the printing paper on which the toner image is fixed is discharged outside by the paper-discharging part.

As is apparent from the foregoing description, it is appreciated that in the laser scanning apparatus of the present invention the number of parts is not only minimized to reduce fabrication cost, but also, productivity is increased. Further, in light of the above-described configurations of the present invention, it is appreciated that the laser scanning apparatus including the second imaging optical system to image the laser beams reflected from the light deflector as uniform light spots on the imaging surface of the photosensitive element, may be provided with only one f-theta lens, minimizing the number of parts in the laser scanning apparatus, reducing fabrication cost, and increasing productivity.

Also, the laser scanning apparatus of the present invention may solve a problem of generating large change in the imaging performance of the lens or reflective mirror even by small optical error thereof in fabrication, increasing optical performance and a degree of freedom in design and fabrication. Further, based on various configurations of the present invention, the second imaging optical system of the laser scanning apparatus may be provided with only one f-theta lens having two refraction faces and a reflection face simultaneously formed at their respective surfaces to increase the optical performance and degree of freedom in design and fabrication of the laser scanning apparatus.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A laser scanning apparatus, comprising:
   a light source to emit light fluxes;
   a first imaging optical system to magnify or reduce the light fluxes emitted from the light source in a given position and angle;
   a light deflector to deflect and reflect the light fluxes penetrated through the first imaging optical system; and
   a second imaging optical system to correct optical errors in the light fluxes reflected from the light deflector, and having a refraction/reflection lens part to alternatively refract and reflect the light fluxes reflected from the light deflector so that the light fluxes are refracted at least two times,
   wherein the refraction/reflection lens part comprises only one lens having a reflection face at one surface thereof, the reflection face being defined by a locus formed by the rotation of a non-circular curved line extending in the main scanning direction, about an axis perpendicular to the sub-scanning direction.

2. The apparatus according to claim 1, wherein the refraction/reflection part comprises another lens at the other surface thereof which includes, a first refraction face to receive the light fluxes reflected from the light deflector; and a second refraction face to refract the light fluxes reflected from the reflection face after being incident through the first refraction face.

3. The apparatus according to claim 2, and
wherein the first and second refraction faces are formed of a shape having a planar or a spherical surface to a sub-scanning direction x and an aspherical surface to a main-scanning direction y, and the reflection face is formed of a shape having a spherical surface to the sub-scanning direction x and a continuously varied-aspherical surface to the main-scanning direction y.

4. The apparatus according to claim 3, wherein the first and second refraction faces and the reflection face are formed to allow angles of normal connecting between centers of curvature and vertexes at respective positions in the main-scanning direction y to be continuously varied.

5. The apparatus according to claim 4, wherein the light source comprises a semiconductor laser having at least one light-emitting point.

6. The apparatus according to claim 5, wherein the first imaging optical system comprises:

a collimating lens to change the light fluxes emitted from the light source into parallel lights;

an opening part to standardize the light fluxes in a given size; and a cylindrical lens having a refractive power to the sub-scanning direction x.

7. The apparatus according to claim 6, wherein the light deflector deflects the light fluxes to make a moving direction of incident light fluxes be opposed and symmetrical to a moving direction of the reflective light fluxes.

8. The apparatus according to claim 2, wherein the first and second refraction faces are formed of a shape having a spherical surface to a sub-scanning direction x and an aspherical surface to a main-scanning direction y, and the reflection face is formed of a shape having a spherical surface to the sub-scanning direction x and a continuously vaned-aspherical surface to the main-scanning direction y.

9. The apparatus according to claim 8, wherein the first and second refraction faces and the reflection face are formed to allow angles of normal connecting between centers of curvature and vertexes at respective positions in the main-scanning direction y to be continuously varied.

10. The apparatus according to claim 9, wherein the light source comprises a semiconductor laser having at least one light-emitting point.

11. The apparatus according to claim 10, wherein the first imaging optical system comprises:

a collimating lens to change the light fluxes emitted from the light source into parallel lights;

an opening part to standardize the light fluxes in a given size; and a cylindrical lens having a refractive power only to the sub-scanning direction x.

12. The apparatus according to claim 11, wherein the light deflector deflects the light fluxes to make a moving direction of incident light fluxes be opposed and symmetrical to a moving direction of the reflective light fluxes.

13. The apparatus according to claim 1, wherein the refraction/reflection lens part comprises:

a first lens; and a reflection face attached on one surface of the first lens.

14. The apparatus according to claim 13, wherein the refraction/reflection lens part further comprises:

a second lens at the other surface thereof including,
a first refraction face to receive the light fluxes reflected from the light deflector; and
a second refraction face to refract the light fluxes reflected from the reflection face after being incident through the first refraction face.

15. A laser scanning apparatus, comprising:

a light source to emit light fluxes;

a first imaging optical system to magnify or reduce the light fluxes emitted from the light source in a given position and angle;

a light deflector to deflect and reflect the light fluxes penetrated through the first imaging optical system; and a second imaging optical system to correct optical errors in the light fluxes reflected from the light deflector, and having a refraction/reflection lens part to alternatively refract and reflect the light fluxes reflected from the light deflector so that the light fluxes are refracted at least two times, wherein the refraction/reflection lens part comprises only one lens having a reflection face at one surface thereof, wherein the refraction/reflection part comprises another lens at the other surface thereof which includes
a first refraction face to receive the light fluxes reflected from the light deflector, and
a second refraction face to refract the light fluxes reflected from the reflection face after being incident through the first refraction face, and wherein the aspherical shapes of the first and second refraction faces and the reflection face are defined as follows:

$$Z(x, y) = \frac{c_y y^2}{1 + \sqrt{1 - (k+1)c_y y^2}} + \hat{Q} \sum_{i=3} A_i y^i +$$

-continued $$\frac{\left[\frac{x^2}{c_x\left(1+\hat{Q}_{m=2} B_m y^m\right)}\right] - 2x\sin\left(\hat{Q}_{n=2} C_n y^n\right)}{\cos\left(\hat{Q}_{n=2} C_n y^n\right) + \sqrt{\cos^2\left(\hat{Q}_{n=2} C_n y^n\right) - \left[\frac{x}{c_x\left(1+\hat{Q}_{m=2} B_m y^m\right)}\right]^2 + \frac{2x\sin\left(\hat{Q}_{n=2} C_n y^n\right)}{c_x\left(1+\hat{Q}_{m=2} B_m y^m\right)}}}$$

wherein, Z is a distance from an optical axis;
x, y are positions or distances to a point on the aspherical surface;
k is a conical coefficient;
A, B are aspherical coefficients;
C is a curvature coefficient; and
l, m, n are positive numbers greater than 3.

16. An image forming apparatus including a laser scanning apparatus to emit light fluxes and a photosensitive drum having an imaging surface to image the light fluxes, the image forming apparatus comprising:
   a first imaging optical system to magnify or reduce the light fluxes;
   a light deflector including a polygon mirror with a plurality of deflective reflection surfaces to deflect and reflect the light fluxes penetrated through the first imaging optical system at a constant linear velocity, and a spindle motor to rotate the polygon mirror at a constant velocity; and
   a second imaging optical system including a scanning lens having a refraction/reflection lens part to alternatively refract and reflect the light fluxes reflected from the light deflector so that the light fluxes are refracted at least two times,
   wherein the refraction/reflection lens part comprises only one lens having a reflection face at one surface thereof, the reflection face being defined by a locus formed by the rotation of a non-circular curved line extending in the main scanning direction, about an axis perpendicular to the sub-scanning direction.

17. The apparatus according to claim 16, wherein the first imaging optical system comprises:
   a collimating lens to change the light fluxes emitted from the light source into parallel lights;
   an opening part to standardize the light fluxes in a given size; and
   a cylindrical lens having a refractive power to a sub-scanning direction x to converge the light fluxes to the sub-scanning direction x and to change the light fluxes into linear lights in a main direction y.

18. The apparatus according to claim 16, wherein the second imaging optical system corrects optical errors in the light fluxes reflected from the light deflector.

19. The apparatus according to claim 16, wherein the refraction/reflection lens part comprises:
   a first lens having a reflection face at one surface refraction/reflection lens part to reflect the light fluxes; and
   a second lens at the other surface thereof which includes a first refraction face to receive the light fluxes reflected from the light deflector, and a second refraction face to refract the light fluxes reflected from the reflection face after being incident through the first refraction face.

20. A laser scanning apparatus including a light source to emit light fluxes, comprising:
   a first imaging optical system to magnify or reduce the light fluxes emitted from the light source in a given position and angle;
   a light deflector to deflect and reflect the light fluxes penetrated through the first imaging optical system; and
   a second imaging optical system including a plurality of scanning lenses, each having a refraction/reflection lens part to alternatively refract and reflect the light fluxes reflected from the light deflector.

21. A laser scanning apparatus, comprising:
   a plurality of light sources to emit light fluxes;
   a first imaging optical system to magnify or reduce the light fluxes emitted from the light sources in a given position and angle;
   a light deflector to deflect and reflect the light fluxes penetrated through the first imaging optical system; and
   a second imaging optical system to correct optical errors in the light fluxes reflected from the light deflector, and having a refraction/reflection lens part to alternatively refract and reflect the light fluxes reflected from the light deflector, the light deflector and the second imaging optical system being arranged to be symmetrical to the light sources,
   wherein the refraction/reflection lens part comprises only one lens having a reflection face at one surface thereof, the reflection face being defined by a locus formed by the rotation of a non-circular curved line extending in the main scanning direction, about an axis perpendicular to the sub-scanning direction.

22. A laser scanning apparatus including a light source to emit light fluxes, comprising:
   a first imaging optical system to magnify or reduce the light fluxes emitted from the light source in a given position and angle;
   a light deflector to deflect and reflect the light fluxes penetrated through the first imaging optical system; and
   a second imaging optical system to correct optical errors in the light fluxes reflected from the light deflector, and including only one f-theta lens having two refraction faces and a reflection face simultaneously formed at surfaces thereof, increasing optical performance and a degree of freedom in design and fabrication of the laser scanning apparatus,
   wherein the reflection face is defined by a locus formed by the rotation of a non-circular curved line extending in the main scanning direction, about an axis perpendicular to the sub-scanning direction.

* * * * *

UNITED STATES PATENT AND TRADEMARK OFFICE
CERTIFICATE OF CORRECTION

| | |
|---|---|
| PATENT NO. | : 6,900,917 B2 |
| APPLICATION NO. | : 10/412243 |
| DATED | : May 31, 2005 |
| INVENTOR(S) | : Hyung-su Kim |

Page 1 of 1

It is certified that error appears in the above-identified patent and that said Letters Patent is hereby corrected as shown below:

<u>Column 11,</u>
Line 44, replace "vaned" with -- varied --.

Signed and Sealed this

Twenty-seventh Day of June, 2006

JON W. DUDAS
*Director of the United States Patent and Trademark Office*